Figure 1:
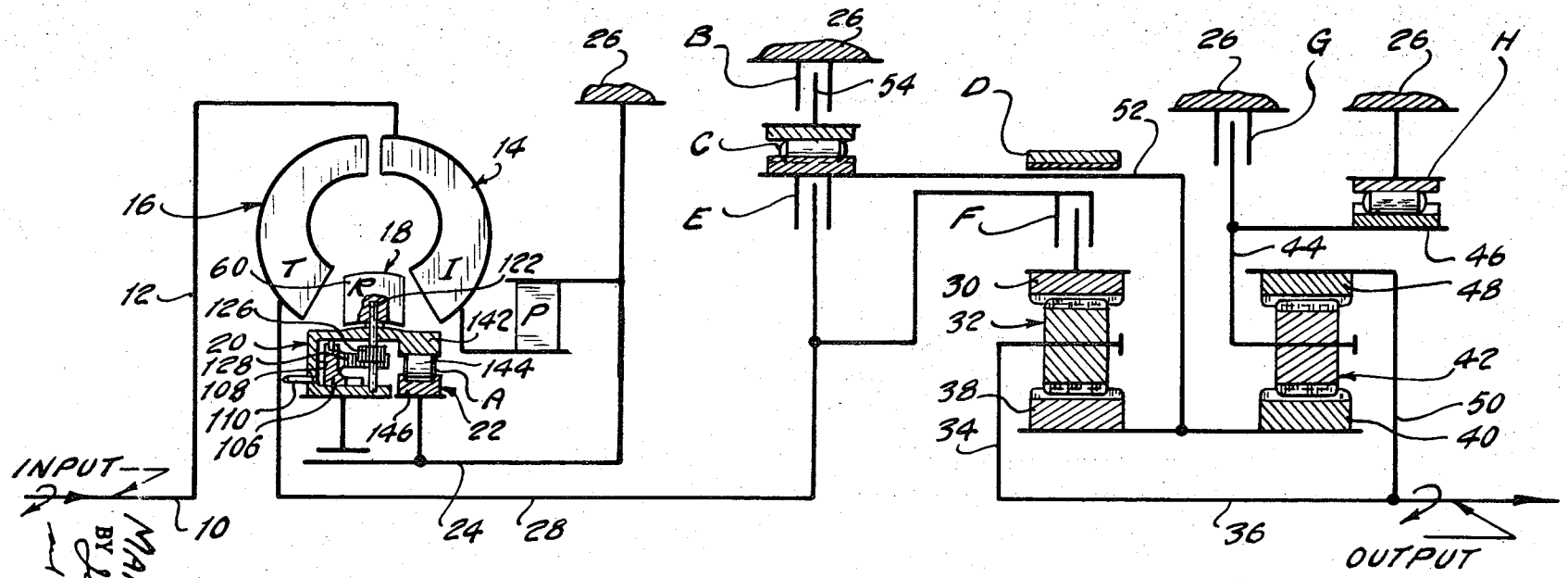
Figure 2:
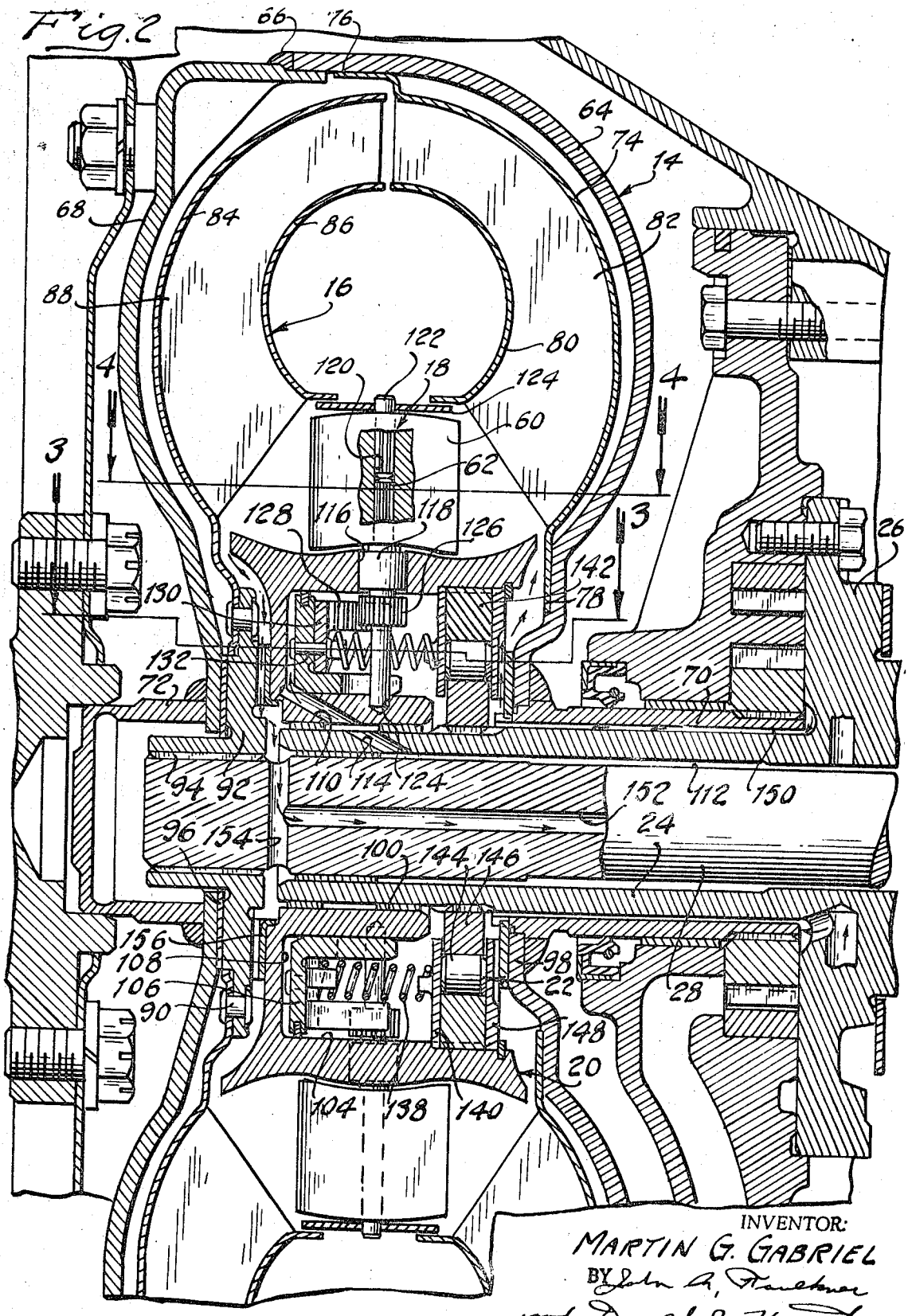
Figure 3:
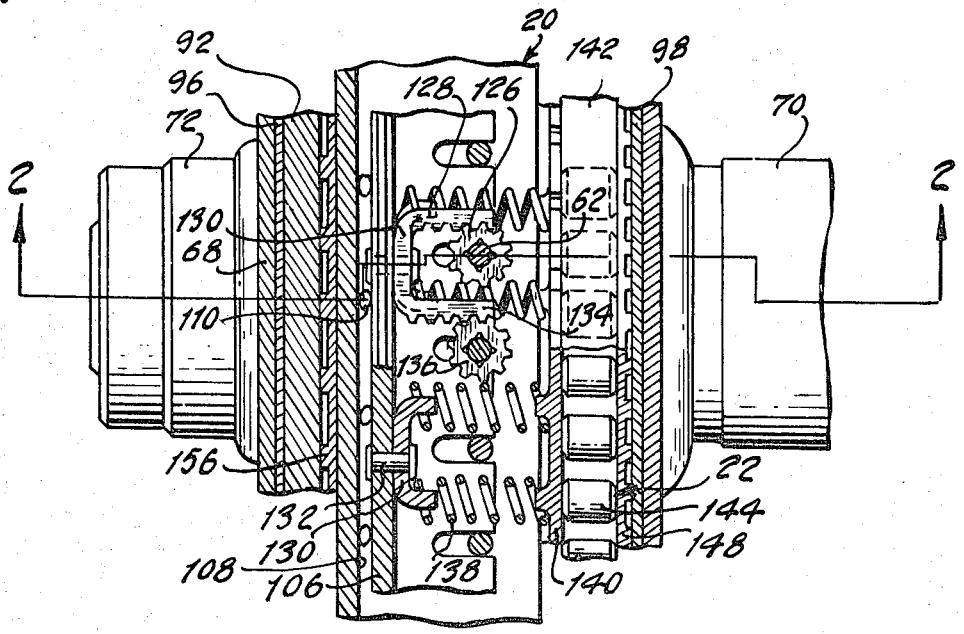
Figure 4:
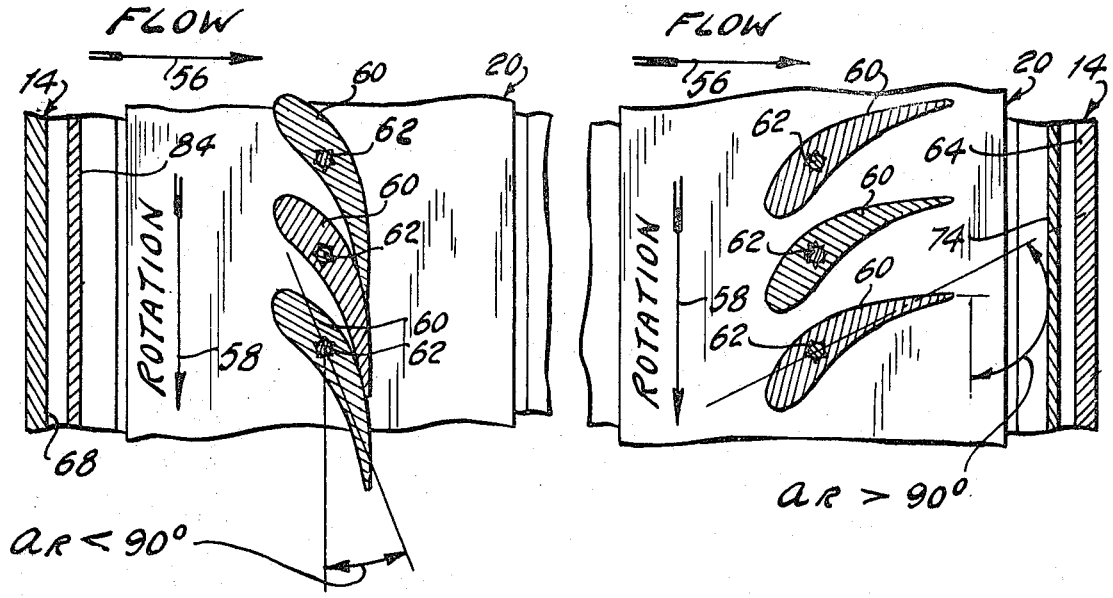
Figures 5, 6:
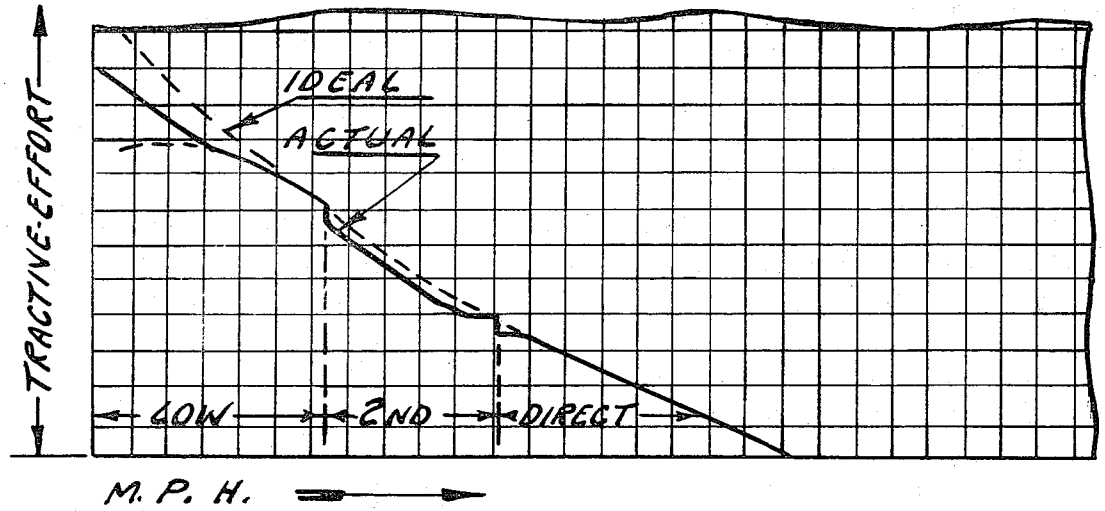

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 4, 1971

886 O.G. 4

T886,001

HYDROKINETIC POWER TRANSMISSION SYSTEM WITH A SUBSTANTIALLY IDEAL FUNCTIONAL RELATIONSHIP BETWEEN OUTPUT SPEED AND TRACTIVE EFFORT

Martin G. Gabriel, Dearborn, Mich., assignor to Ford Motor Company, Dearborn, Mich.

Continuation-in-part of application Ser. No. 518,853, Jan. 5, 1966. This application May 20, 1968, Ser. No. 738,368

Int. Cl. F16h *47/00*

U.S. Cl. 74—732

4 Sheets Drawing. 13 Pages Specification

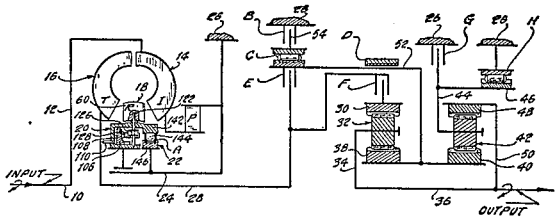

This specification describes a hydrokinetic torque converter transmission having an increased low speed torque-ratio in geared portions of the mechanism and having a bladed stator of variable geometry in the torque convertor portion of the mechanism. The individual stator blades are mounted on rotatable stator blade shafts which can be rotated to effect angular adjustment of the stator blades by means of a rack-and-pinion servo. An increased degree of deflection of the toroidal fluid flow in the stator region of the circuit is obtained as the converter speed ratio increases thereby providing an overall torque ratio characteristic that approaches a theoretical, ideal performance.

May 4, 1971 M. G. GABRIEL T886,001

HYDROKINETIC POWER TRANSMISSION SYSTEM WITH A SUBSTANTIALLY IDEAL FUNCTIONAL RELATIONSHIP BETWEEN OUTPUT SPEED AND TRACTIVE EFFORT

Filed May 20, 1968 4 Sheets-Sheet 1

INVENTOR:
MARTIN G. GABRIEL
BY John A. Hardaway
and Donald J. Harrington
ATTORNEYS.

May 4, 1971 M. G. GABRIEL T886,001

HYDROKINETIC POWER TRANSMISSION SYSTEM WITH A SUBSTANTIALLY IDEAL FUNCTIONAL RELATIONSHIP BETWEEN OUTPUT SPEED AND TRACTIVE EFFORT

Filed May 20, 1968 4 Sheets-Sheet 2

INVENTOR:
MARTIN G. GABRIEL
BY John A. Hawkins
and Donald J. Harrington
ATTORNEYS.

HYDROKINETIC POWER TRANSMISSION SYSTEM WITH A SUBSTANTIALLY IDEAL FUNCTIONAL RELATIONSHIP BETWEEN OUTPUT SPEED AND TRACTIVE EFFORT

Filed May 20, 1968 4 Sheets-Sheet 3

INVENTOR:
MARTIN G. GABRIEL
BY John A. Thurlow
and Donald J. Harrington
ATTORNEYS.

HYDROKINETIC POWER TRANSMISSION SYSTEM WITH A SUBSTANTIALLY IDEAL FUNCTIONAL RELATIONSHIP BETWEEN OUTPUT SPEED AND TRACTIVE EFFORT

Filed May 20, 1968 4 Sheets-Sheet 4

| | A | B | C | D | E | F | G | H |
|---|---|---|---|---|---|---|---|---|
| MANUAL LOW | 2 | — | — | ON(2ND) | — | ON | ON(LOW) | ENG'D. |
| LOW | 2 | — | — | — | — | ON | — | ENG'D. |
| 2ND | 1 | ON | ENG'D. | — | — | ON | — | — |
| DIRECT | 1 | ON | — | — | ON | ON | — | — |
| DIRECT(CRUISE) | 2 | ON | — | — | ON | ON | — | — |
| REVERSE | 1 OR 2 | — | — | — | ON | — | ON | — |
| NEUTRAL | 2 | — | — | — | — | — | — | — |

INVENTOR:
MARTIN G. GABRIEL
BY
ATTORNEYS.